United States Patent
Shimizu

(10) Patent No.: US 9,591,280 B2
(45) Date of Patent: Mar. 7, 2017

(54) IMAGE PROCESSING APPARATUS, IMAGE PROCESSING METHOD, AND COMPUTER-READABLE RECORDING MEDIUM

(71) Applicant: FUJITSU LIMITED, Kawasaki-shi, Kanagawa (JP)

(72) Inventor: Seiya Shimizu, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 404 days.

(21) Appl. No.: 14/165,632

(22) Filed: Jan. 28, 2014

(65) Prior Publication Data
US 2014/0139640 A1 May 22, 2014

Related U.S. Application Data

(63) Continuation of application No. PCT/JP2011/067523, filed on Jul. 29, 2011.

(51) Int. Cl.
*H04N 13/00* (2006.01)
*G06K 9/00* (2006.01)
*G06T 3/00* (2006.01)

(52) U.S. Cl.
CPC ..... *H04N 13/0007* (2013.01); *G06K 9/00791* (2013.01); *G06T 3/0062* (2013.01)

(58) Field of Classification Search
CPC .............. G06K 9/00791; G06T 3/0062; H04N 13/0007
See application file for complete search history.

(56) References Cited

U.S. PATENT DOCUMENTS 7,307,655 B1 * 12/2007 Okamoto ........... G06K 9/00791
348/222.1
2013/0033494 A1 * 2/2013 Kiyota ..................... B60R 1/00
345/420

FOREIGN PATENT DOCUMENTS

JP 07-017328 1/1995
JP 2002-083285 3/2002
(Continued)

OTHER PUBLICATIONS

Seiya Shimizu et al, "System Giving Wraparound view of Vehicles", vol. 60, No. 5, pp. 496-501, (Sep. 2009) English Abstract.
(Continued)

*Primary Examiner* — Andy Rao
*Assistant Examiner* — Tyler Edwards
(74) *Attorney, Agent, or Firm* — Fujitsu Patent Center

(57) ABSTRACT

An image processing apparatus includes a coordinate conversion unit and a drawing unit. The coordinate conversion unit obtains a coordinate of an intersection $P_{VG}$ between a stereoscopic projection plane and a line connecting a ground point $P_{RG}$ of a stereoscopic object and a virtual viewpoint position $V_P$, and a coordinate of an intersection $P_V$ between a line extending upward from the intersection $P_{VG}$ and a line connecting a point $P_R$ of the stereoscopic object and the virtual viewpoint position $V_P$. The drawing unit projects an image of the ground point $P_{RG}$ of the stereoscopic object at the position of the coordinate of $P_{VG}$, and projects the image of $P_R$ of the stereoscopic object at the position of $P_V$.

6 Claims, 15 Drawing Sheets

(56) References Cited

FOREIGN PATENT DOCUMENTS

| | | |
|---|---|---|
| JP | 3286306 | 3/2002 |
| JP | 2002-359838 | 12/2002 |
| JP | 2003-132349 | 5/2003 |
| JP | 2006-253872 | 9/2006 |
| JP | 2008-141643 | 6/2008 |
| JP | 2009-232310 | 10/2009 |
| JP | 2009-298178 | 12/2009 |
| JP | 2010-128951 | 6/2010 |
| WO | 0007373 | 2/2000 |

OTHER PUBLICATIONS

International Search Report, mailed in connection with PCT/JP2011/067523 and mailed Sep. 20, 2011.

* cited by examiner

FIG.3

| POLYGON ID | APEX ID | POLYGON APEX COORDINATE VALUE | | | IMAGE COORDINATE VALUE | |
|---|---|---|---|---|---|---|
| | | X | Y | Z | S | T |
| 1 | 1 | $x_1$ | $y_1$ | $z_1$ | $S_1$ | $T_1$ |
| | 2 | ... | ... | ... | ... | ... |
| | 3 | ... | ... | ... | ... | ... |
| | 4 | ... | ... | ... | ... | ... |
| 2 | 1 | ... | ... | ... | ... | ... |
| | 2 | ... | ... | ... | ... | ... |
| | 3 | ... | ... | ... | ... | ... |
| | 4 | ... | ... | ... | ... | ... |
| 3 | 1 | ... | ... | ... | ... | ... |
| | 2 | ... | ... | ... | ... | ... |
| | 3 | ... | ... | ... | ... | ... |
| | 4 | ... | ... | ... | ... | ... |
| ⋮ | ⋮ | ⋮ | ⋮ | ⋮ | ⋮ | ⋮ |

| APEX ID | APEX COORDINATE VALUE | | | IMAGE COORDINATE VALUE | |
|---|---|---|---|---|---|
| | X | Y | Z | S | T |
| 1 | $X_1$ | $Y_1$ | $Z_1$ | $S_1$ | $T_1$ |
| 2 | $X_2$ | $Y_2$ | $Z_2$ | $S_2$ | $T_2$ |
| 3 | ... | ... | ... | ... | ... |
| 4 | ... | ... | ... | ... | ... |
| 5 | ... | ... | ... | ... | ... |
| 6 | ... | ... | ... | ... | ... |
| 7 | ... | ... | ... | ... | ... |
| 8 | ... | ... | ... | ... | ... |
| ⋮ | ⋮ | ⋮ | ⋮ | ⋮ | ⋮ |

110b

VEHICLE COORDINATE SYSTEM

IMAGE COORDINATE SYSTEM $Q = T(V_{in})$ $Q = (qx, qy)$

IMAGE PROCESSING APPARATUS, IMAGE PROCESSING METHOD, AND COMPUTER-READABLE RECORDING MEDIUM

CROSS-REFERENCE TO RELATED APPLICATION

This application is a continuation of International Application No. PCT/JP2011/067523, filed on Jul. 29, 2011, the entire contents of which are incorporated herein by reference.

FIELD

The embodiment discussed herein is directed to an image processing apparatus and the like.

BACKGROUND

There has been a technique for compositing images photographed with a plurality of cameras mounted around a vehicle to generate a bird's-eye view of the vehicle as viewed from above the vehicle.

For example, according to Japanese Patent No. 3286306, a bird's-eye view is generated by mapping camera images on a plane assuming that the entire objects photographed with cameras exist on a road surface. FIG. 17 is a diagram depicting an example of the bird's-eye view formed based on Japanese Patent No. 3286306. Japanese Patent No. 3286306, however, has a problem that a stereoscopic object having a height component above the road surface is distorted largely as depicted in FIG. 17. This problem is solved in, for example, Japanese Laid-open Patent Publication No. 2003-132349 or Japanese Laid-open Patent Publication No. 07-17328.

In Japanese Laid-open Patent Publication No. 2003-132349, an elliptical stereoscopic projection plane around a vehicle is set and camera images are projected through linear mapping on the elliptical stereoscopic projection plane, so that a bird's-eye view is generated. FIG. 18 is a diagram depicting an example of a bird's-eye view formed based on Japanese Laid-open Patent Publication No. 2003-132349. As depicted in FIG. 18, since the stereoscopic projection plane has a height component, the distortion of the stereoscopic object can be suppressed as compared with the distortion in Japanese Patent No. 3286306.

In Japanese Laid-open Patent Publication No. 07-17328, the shape of the stereoscopic object around a vehicle is measured using a range sensor or the like. Then, in Japanese Laid-open Patent Publication No. 07-17328, based on the measurement results, a partial projection plane having a height component is installed at a position where the stereoscopic object actually exists, and camera images are nonlinearly projected on this projection plane, so that a bird's-eye view is generated. FIG. 19 is a diagram depicting an example of the bird's-eye view formed based on Japanese Laid-open Patent Publication No. 07-17328. As depicted in FIG. 19, since the camera images are projected to the projection plane having a height component, the distortion of the stereoscopic object can be suppressed.

Patent Document 4: Japanese Laid-open Patent Publication No. 2002-359838
Patent Document 5: Japanese Laid-open Patent Publication No. 2009-298178
Patent Document 6: Japanese Laid-open Patent Publication No. 2006-253872

In the patent documents described above, however, there has been a problem that the stereoscopic object is not displayed in bird's-eye view as appropriate.

For example, in Japanese Laid-open Patent Publication No. 2003-132349, since the camera images are projected to the stereoscopic projection plane through linear mapping, the stereoscopic object may be mapped outside the stereoscopic projection plane depending on the position of the stereoscopic object. FIG. 20 is a diagram for describing the problem of the conventional technique. In an actual space 1 to be photographed by cameras where persons 1a to 1g are present, the persons 1c to 1g included in a range 2b are not mapped on a stereoscopic projection plane 2a in a mapped virtual space 2, so that the persons 1c to 1g get out of the range of the stereoscopic projection plane 2a. FIG. 18 also illustrates the stereoscopic object in a region 3, which is out of the stereoscopic projection plane.

Moreover, although Japanese Laid-open Patent Publication No. 07-17328 discloses the installation of a partial projection plane, how the camera images are projected to this projection plane is not disclosed; therefore, it cannot be said that the stereoscopic object is displayed in a bird's-eye view with high accuracy.

SUMMARY

According to an aspect of an embodiment, an image processing apparatus includes a memory; and a processor coupled to the memory, wherein the processor executes a process comprising: calculating a coordinate of a first intersection representing an intersection between a stereoscopic projection plane and a line connecting a virtual viewpoint and an intersection between a plane and a line extending downward from a position of an object, and a coordinate of a second intersection representing an intersection between a line extending upward from the first intersection and a line connecting the position of the object and the virtual viewpoint; and projecting an image of the object to the coordinate of the second intersection.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 depicts an example of a data structure of stereoscopic projection plane polygon data.

FIG. 4 depicts an example of a data structure of a peripheral stereoscopic object point data.

DESCRIPTION OF EMBODIMENTS

Preferred embodiments of the present invention will be explained with reference to accompanying drawings. However, the present invention is not limited to this embodiment.

Figure 1:
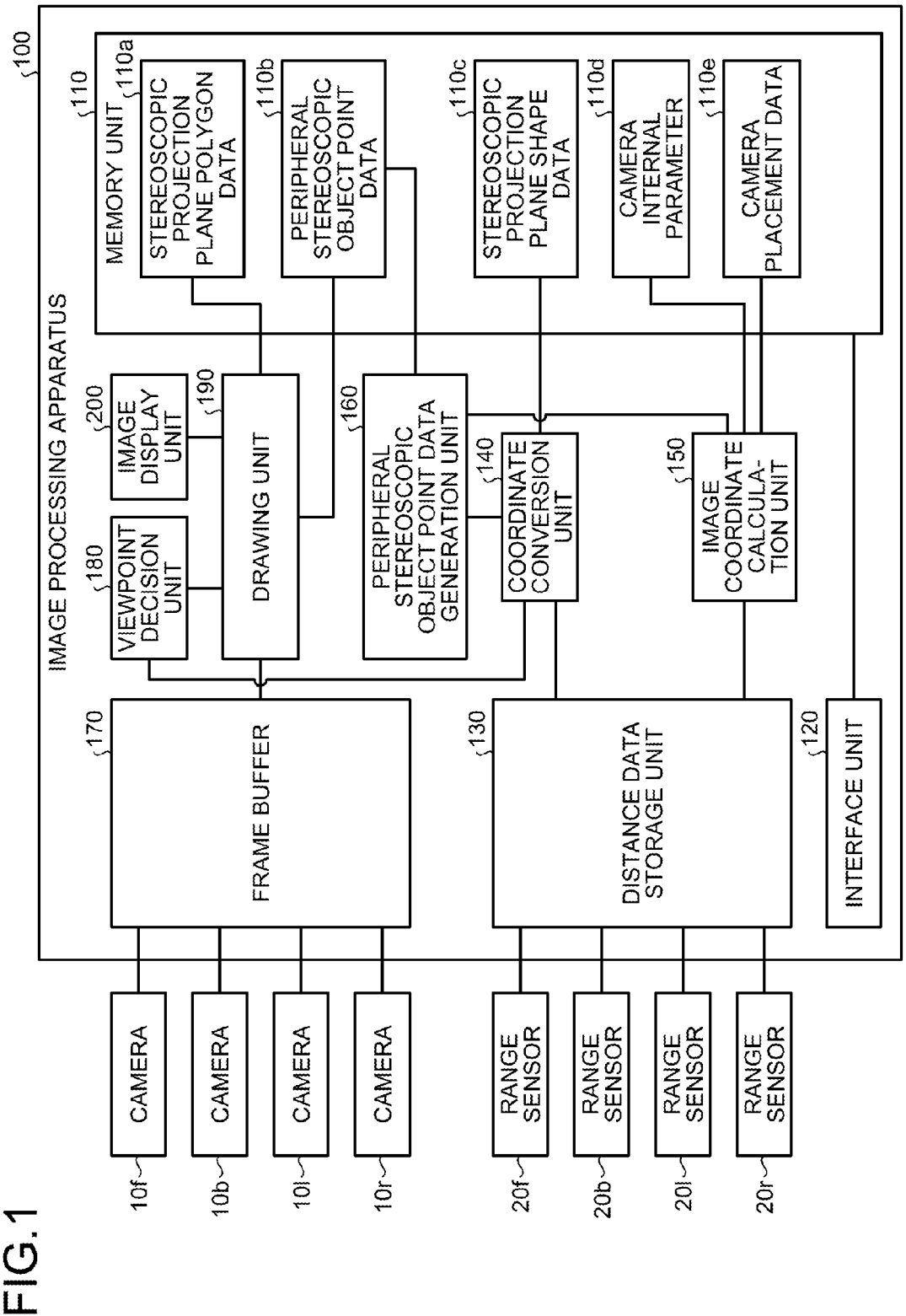
FIG. 1 depicts a structure of an image processing apparatus according to this embodiment.

A structure of an image processing apparatus according to this embodiment is described. The image processing apparatus is mounted on a moving body such as a vehicle. FIG. 1 depicts a structure of the image processing apparatus according to this embodiment. As depicted in FIG. 1, this image processing apparatus 100 is connected to cameras 10f, 10b, 10l, and 10r. Further, the image processing apparatus 100 is connected to range sensors 20f, 20b, 20l, and 20r.

Each of the cameras 10f, 10b, 10l, and 10r has a wide-angle lens such as a fisheye lens. The wide-angle lens may be, for example, a fisheye lens. The cameras 10f, 10b, 10l, and 10r photograph images in a photographing range, and output the image data to the image processing apparatus 100. The range sensors 20f, 20b, 20l, and 20r are devices for, for example, measuring the distance from the range sensor to the target. The range sensors 20f, 20b, 20l, and 20r output the measured distance data to the image processing apparatus 100.

Figure 2:
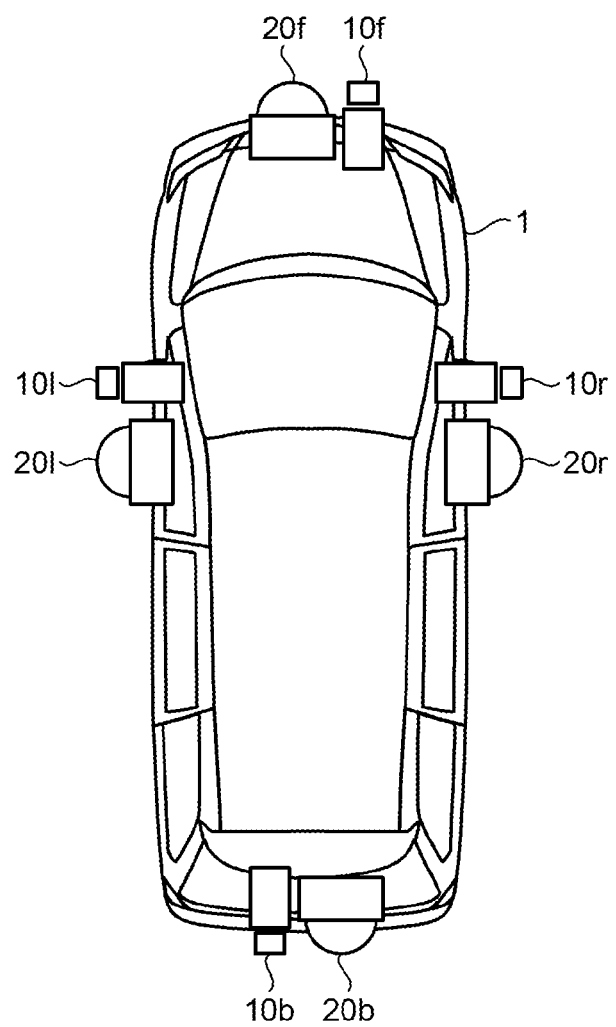
FIG. 2 depicts an example of positions where cameras and range sensors are installed.

Here, an example of the positions where the cameras 10f, 10b, 10l, and 10r and the range sensors 20f, 20b, 20l, and 20r are installed is described. FIG. 2 depicts an example of the positions where the cameras and the range sensors are installed.

In FIG. 2, the vehicle 1 is a vehicle having the image processing apparatus 100 mounted thereon. As depicted in FIG. 2, the camera 10f and the range sensor 20f are installed in the front of the vehicle 1. The camera 10b and the range sensor 20b are installed in the back of the vehicle 1. The camera 10l and the range sensor 20l are installed in the left part of the vehicle 1. The camera 10r and the range sensor 20r are installed in the right part of the vehicle 1.

See FIG. 1 again. The image processing apparatus 100 includes a memory unit 110, an interface unit 120, a distance data storage unit 130, a coordinate conversion unit 140, an image coordinate calculation unit 150, and a peripheral stereoscopic object point data generation unit 160. The image processing apparatus 100 moreover includes a frame buffer 170, a viewpoint decision unit 180, a drawing unit 190, and an image display unit 200.

The memory unit 110 includes stereoscopic projection plane polygon data 110a, peripheral stereoscopic object point data 110b, stereoscopic projection plane shape data 110c, a camera internal parameter 110d, and camera placement data 110e.

The stereoscopic projection plane polygon data 110a are data obtained by associating a three-dimensional coordinate value on the stereoscopic projection plane formed of a polygon and a coordinate value of the pixel on the camera image. Although the element of the polygon is square in the description below, the shape is not limited to the square but may be another polygonal shape. Further, the coordinate value of the pixel on the camera image is referred to as an image coordinate value in the description below.

FIG. 3 depicts an example of the data structure of the stereoscopic projection plane polygon data. As depicted in FIG. 3, in the stereoscopic projection plane polygon data 110a, a polygon ID, an apex ID, a polygon apex coordinate value, and the image coordinate value are associated with each other. The polygon ID refers to the information for uniquely identifying the polygon. The apex ID refers to the information for identifying each apex of the polygon. The polygonal apex coordinate value refers to the three-dimensional coordinate value corresponding to the apex of the polygon. The stereoscopic projection plane polygon data 110a are generated by a stereoscopic projection plane polygon data generation device to be described later.

The peripheral stereoscopic object point data 110b are the data for associating the three-dimensional coordinate value of the apex of the stereoscopic object present around the vehicle and the image coordinate value. FIG. 4 depicts an example of the data structure of the peripheral stereoscopic object point data. As depicted in FIG. 4, in the peripheral stereoscopic object point data 110b, the apex ID, the apex coordinate value, and the image coordinate value are associated with each other. The apex ID refers to the information for uniquely identifying the apex of the stereoscopic object. The apex coordinate value is the coordinate value of the apex of the stereoscopic object. The image coordinate value is the pixel value of the pixel on the camera image as aforementioned. The peripheral stereoscopic object point data 110b are generated by the peripheral stereoscopic object point data generation unit 160 to be described later.

Figure 5A:
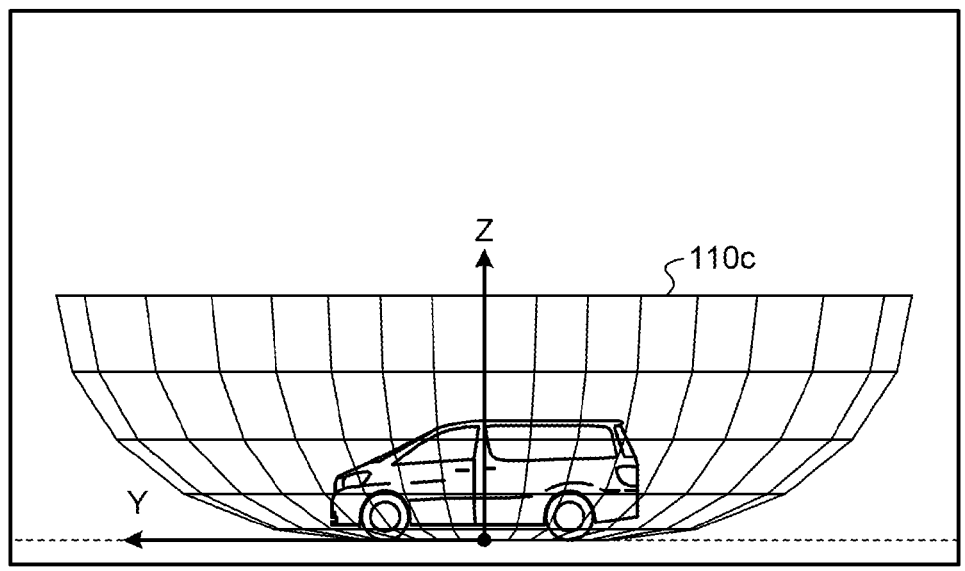
FIG. 5A depicts the shape of a stereoscopic projection plane viewed from a side of a vehicle 1.
Figure 5B:
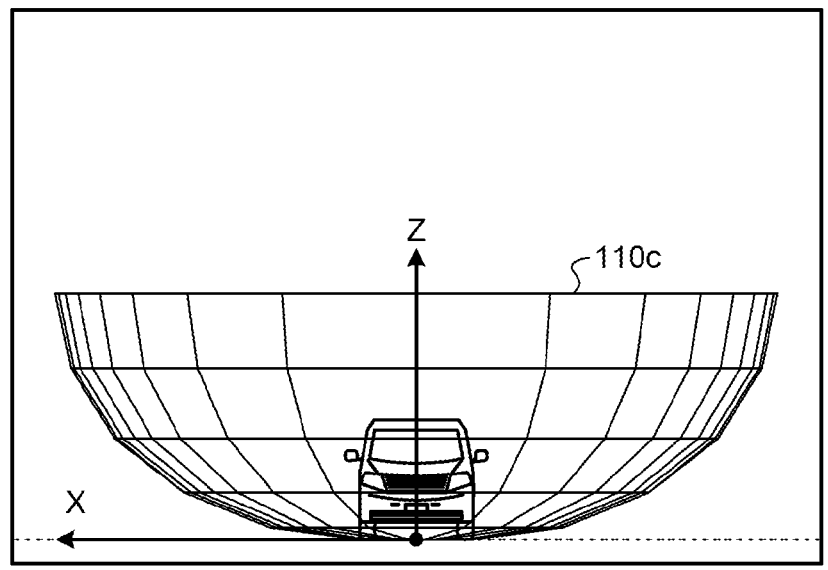
FIG. 5B depicts the shape of a stereoscopic projection plane viewed from the front of the vehicle 1.

The stereoscopic projection plane shape data 110c refer to the shape data of the stereoscopic projection plane. FIG. 5A depicts the shape of the stereoscopic projection plane viewed from a side of the vehicle 1. FIG. 5B depicts the shape of the stereoscopic projection plane viewed from the front of the vehicle 1. For example, the bottom of the stereoscopic projection plane shape data 110c can be approximated to the plane of a road around the vehicle. The side surface of the stereoscopic projection plane shape data 110c are more inclined as away from the vehicle.

Note that the shape of the stereoscopic projection plane depicted in FIG. 5A and FIG. 5B is merely an example. The shape of the stereoscopic projection plane may be any shape as long as the shape surrounds the vehicle 1. For example, the shape may be a hemispherical shape, an elliptical hemispherical shape, an n-gonal prism, or an m-gonal pyramid where n and m represent a natural number of 3 or more. Moreover, any of the hemispherical shape, the elliptical spherical shape, the n-gonal prism, and the m-gonal pyramid may be combined with another to form the shape of the stereoscopic projection plane.

The camera internal parameter 110d includes, for example, the information of the lens distortion of the cameras 10f, 10b, 10l, and 10r. The lens distortion refers to the distortion due to the lens aberration.

The camera placement data 110e include the three-dimensional coordinate values representing the positions where the cameras 10f, 10b, 10l, and 10r are installed. The camera placement data 110e include the roll angle, the pitch angle, and the yaw angle of the cameras 10f, 10b, 10l, and 10r.

The interface unit 120 is a process unit that is connected to an external device for exchanging data with the external device. For example, the interface unit 120 accepts the stereoscopic projection plane polygon data 110a from a stereoscopic projection plane polygon data generation device 300 to be described later, and stores the data 110a in the memory unit 110. For example, the interface unit 120 corresponds to an input/output interface device.

The distance data storage unit 130 is a memory device for storing the distance to the stereoscopic object measured by the range sensors 20f, 20b, 20l, and 20r. For example, each range sensor 20 measures the distance to the stereoscopic object for every 1/30 seconds, and updates the measurement result stored in the distance data storage unit 130.

The coordinate conversion unit 140 is a process unit for converting the three-dimensional coordinate value of the stereoscopic object in the actual space to the three-dimensional coordinate value in the virtual space. The coordinate conversion unit 140 associates the three-dimensional coordinate value of the stereoscopic object in the actual space and the three-dimensional coordinate value of the stereoscopic object in the virtual space, and outputs to the peripheral stereoscopic object point data generation unit 160. Note that the coordinate conversion unit 140 calculates the coordinate of the stereoscopic object in the actual space on the basis of the distance between the vehicle 1 and the stereoscopic object stored in the distance data storage unit 130. The coordinate conversion unit 140 may calculate the coordinate of the stereoscopic object using any conventional technique.

Figure 6:
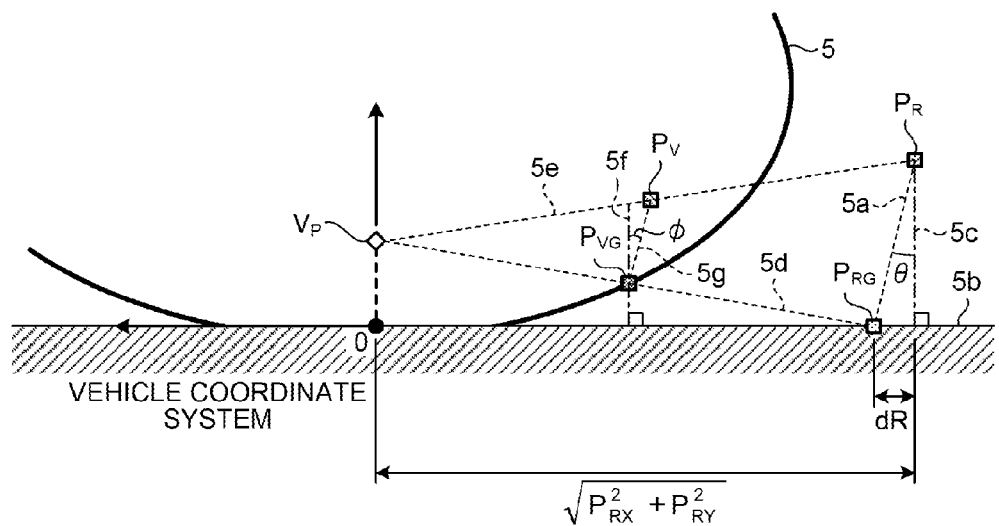
FIG. 6 is an explanatory view for a process of a coordinate conversion unit.

The process of the coordinate conversion unit 140 is specifically described. FIG. 6 is a diagram for describing the process of the coordinate conversion unit. In FIG. 6, the description is made of the case where a three-dimensional coordinate value $P_R$ ($P_{RX}$, $P_{RY}$, $P_{RZ}$) in the actual space is converted into a three-dimensional coordinate value $P_V$ in the virtual space. For example, $P_R$ is assumed as the three-dimensional coordinate of the apex of a certain stereoscopic object. A virtual viewpoint position $V_P$ is the position to be the reference for forming the entire circumferential image. The coordinate conversion unit 140 acquires the information of the virtual viewpoint position $V_P$ from the viewpoint decision unit 180. A reference symbol 5 denotes the stereoscopic projection plane. The coordinate conversion unit 140 acquires the shape of the stereoscopic projection plane 5 from the stereoscopic projection plane shape data 110c. Note that the coordinate system in FIG. 6 is the vehicle coordinate system with the center of the vehicle 1 serving as the origin.

The coordinate conversion unit 140 obtains a coordinate value $P_{RG}$ on the road surface 5b corresponding to the coordinate value $P_R$. The coordinate value $P_{RG}$ is the point on a plane that includes the coordinate value $P_R$ and the virtual viewpoint position $V_P$ and that is vertical to the road surface 5b. The coordinate value $P_{RG}$ is an intersection between the road surface 5b and a line 5a that is directed toward the road surface at an angle θ from a line 5c that extends vertically downward from $P_R$. The coordinate value $P_{RG}$ is represented by Formula (1).

$$P_{RG} = \frac{\sqrt{P_{RX}^2 + P_{RY}^2} - P_{RZ}\tan\theta}{\sqrt{P_{RX}^2 + P_{RY}^2}}(P_{RX}, P_{RY}, 0) \quad (1)$$

Here, as for the reference symbol θ, the direction from the line 5c to the virtual viewpoint position $V_P$ is positive. θ may range from −90° to 90° but preferably ranges from −45° to 45° substantially. The coordinate conversion unit 140 calculates the coordinate value $P_{RG}$ using Formula (1).

Since the coordinate value $P_{RG}$ is the point on the road surface, the image on this point is projected to the coordinate value $P_{VG}$ on the stereoscopic projection plane 5 by the virtual viewpoint projection. The coordinate value $P_{VG}$ is an intersection between a line 5d and the stereoscopic projection plane 5. The line 5d is a line connecting the virtual viewpoint position $V_P$ and the coordinate value $P_{RG}$. As for a portion where the stereoscopic projection plane 5 is in contact with the road plane, $P_{VG}$ and $P_{RG}$ have the same coordinate value and coincide with each other. The coordinate value of the road plane along the z-axis is 0.

The coordinate value $P_{VG}$ is a coordinate on a road surface corresponding to the stereoscopic object on the entire circumferential image. Therefore, the coordinate value $P_V$ exists above the coordinate value $P_{VG}$. The coordinate value $P_V$ is the coordinate on a plane that includes the coordinate value $P_{VG}$ and the virtual viewpoint position $V_P$ and that is vertical to the road surface 5b. The coordinate value $P_V$ is defined as an intersection between a line 5e and a line 5g, the line 5e connecting the coordinate value $P_{VG}$ and the virtual viewpoint position $V_P$ and the line 5g having an angle φ from a line 5f that passes through the coordinate $P_{VG}$ and that is vertical to the road surface 5b.

Here, as for the reference symbol φ, the direction from the line 5f to the coordinate $P_R$ is positive. φ may be any angle at which the line 5g and the line 5e intersect with each other in the logically finite range. As an example, the angle φ and the angle θ are equal to each other in this embodiment.

Assuming that the angle φ and the angle θ are equal to each other, a triangle $V_P P_{VG} P_V$ and a triangle $V_P P_{RG} P_R$ are similar figures. Therefore, the coordinate value $P_V$ is represented by Formula (2). The coordinate conversion unit 140 calculates the coordinate value $P_V$ using Formula (2).

$$P_V = \frac{|P_{VG} - V_P|}{|P_{RG} - V_P|}(P_R - V_P) - V_P \quad (2)$$

Figure 7:
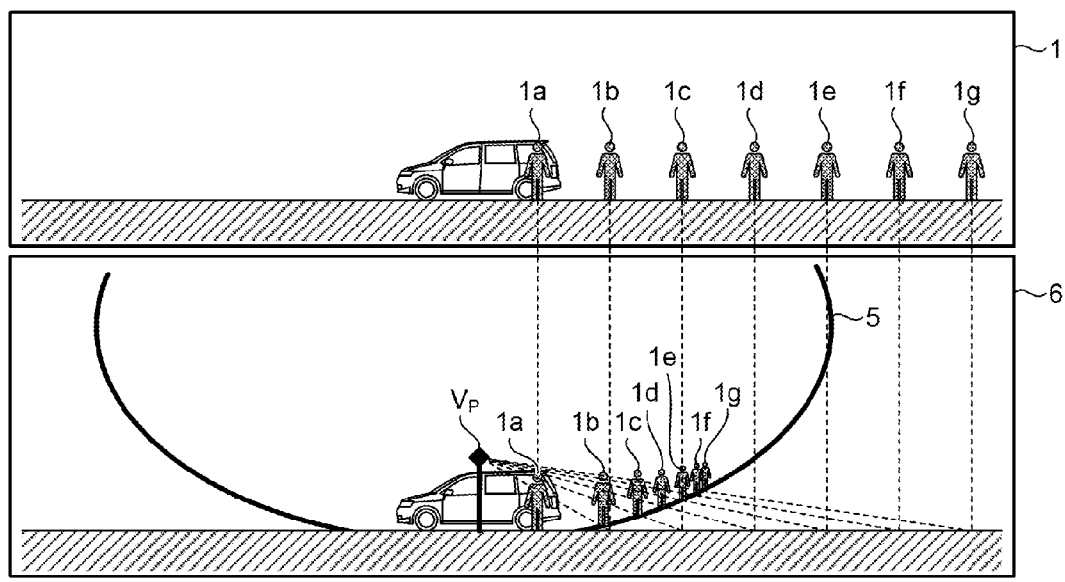
FIG. 7 depicts the relation between an object in an actual space and an object in a virtual space.

Thus, the coordinate conversion unit 140 converts the three-dimensional coordinate value $P_R$ in the actual space into the three-dimensional coordinate value $P_V$ in the virtual space using Formulae (1) and (2). By such coordinate conversion, the object in the actual space can be mapped in the virtual space within the range not largely departing from the stereoscopic projection plane. FIG. 7 depicts the relation between the object in the actual space and the object in the virtual space. As depicted in FIG. 7, the persons 1a to 1g are present in the actual space 1. When the coordinate conversion unit 140 maps the persons 1a to 1g in this actual space 1 to a virtual space 6, the persons 1a to 1g are mapped on the stereoscopic projection plane 5. Every time the distance data of the distance data storage unit 130 are updated, the coordinate conversion unit 140 executes the above process repeatedly.

See FIG. 1 again. The image coordinate calculation unit 150 is a process unit for associating the image coordinate value and the three-dimensional coordinate value in the actual space on the basis of the camera internal parameter 110d and the camera placement data 110e. The image coordinate calculation unit 150 outputs the relation between the image coordinate value and the three-dimensional coordinate in the actual space to the peripheral stereoscopic object point data generation unit 160.

Figure 8A:
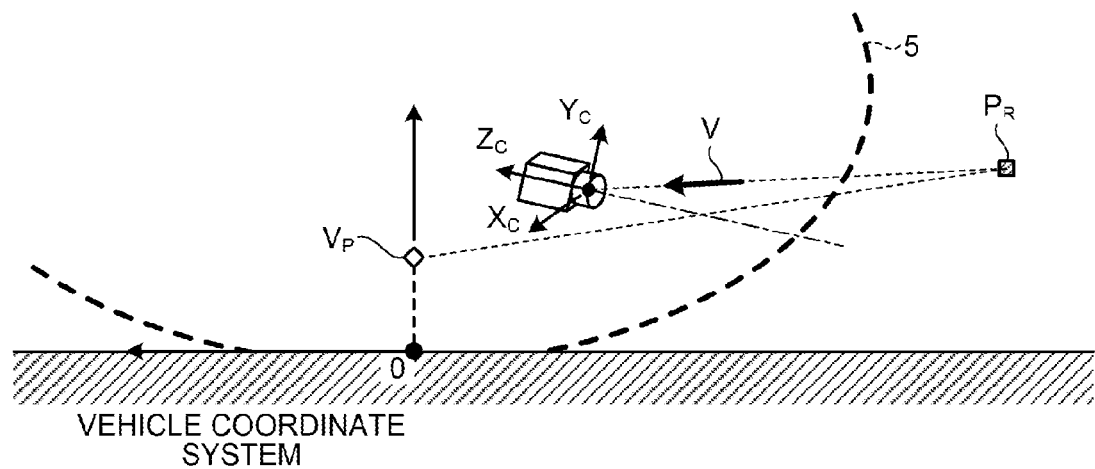
FIG. 8A is an explanatory view (1) for a process of an image coordinate calculation unit.
Figure 8B:
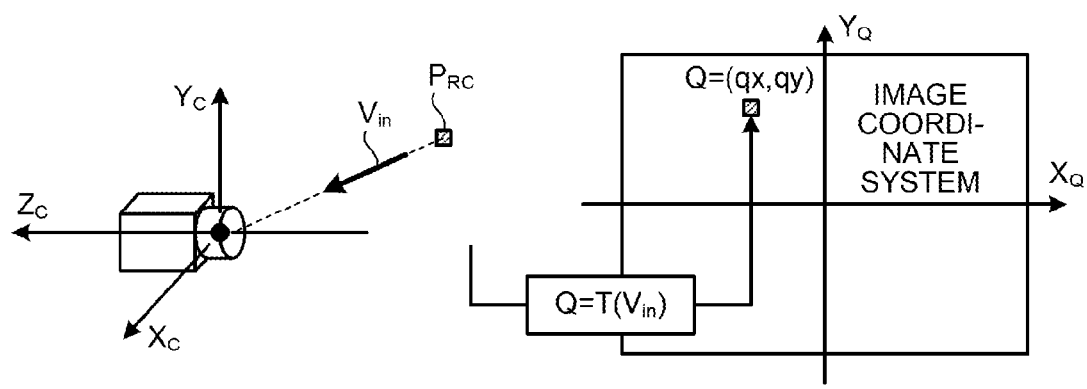
FIG. 8B is an explanatory view (2) for a process of an image coordinate calculation unit.

The process of the image coordinate calculation unit 150 is described specifically. FIG. 8A and FIG. 8B are diagrams for describing the process of the image coordinate calculation unit. In FIG. 8A, the three-dimensional coordinate value $P_R$ is measured by the range sensors 20f, 20b, 20l, and 20r; therefore, the three-dimensional coordinate value $P_R$ is the coordinate value for the vehicle coordinate system. First, the image coordinate calculation unit 150 converts the coordinate value $P_R$ for the vehicle coordinate system into a coordinate value $P_{RC}$ for the camera coordinate system. The X-axis, Y-axis, and Z-axis of the camera coordinate system are denoted by $X_C$, $Y_C$, and $Z_C$, respectively. Note that V in FIG. 8A represents the vector of the incident light from the coordinate value to the center of the camera.

For example, the image coordinate calculation unit 150 converts the coordinate value $P_R$ for the vehicle coordinate system into the coordinate value $P_{RC}$ for the camera coordinate system using Formula (3). In Formula (3), M represents the 4×4 coordinate conversion matrix, and is uniquely determined by the camera placement data 110e.

$$\begin{bmatrix} P_{RC}^T \\ 1 \end{bmatrix} = M \begin{bmatrix} P_R^T \\ 1 \end{bmatrix} \quad (3)$$

See FIG. 8B. In FIG. 8B, the X-axis and Y-axis of the image coordinate system are denoted by $X_Q$ and $Y_Q$, respectively. The image coordinate calculation unit 150 calculates an incident light vector $V_{in}$ of the camera coordinate system after obtaining the coordinate value $P_{RC}$. $V_{in}$ is defined by Formula (4).

$$V_{in} = -\frac{P_{RC}}{|P_{RC}|} \quad (4)$$

After calculating the incident light vector $V_{in}$, the image coordinate calculation unit 150 calculates a position Q on the image coordinate where the incident light vector $V_{in}$ is photographed. The position Q corresponds to the image coordinate value. The relation between the incident light vector $V_{in}$ and the position Q is defined by Formula (5). In Formula (5), T represents a function or a table representing the relation between the photographing position and the incident light vector defined for every camera, which is uniquely determined by the camera internal parameter 110d.

$$Q = T(V_{in}) \quad (5)$$

As thus described, the image coordinate calculation unit 150 associates the three-dimensional coordinate value $P_R$ in the actual space and the image coordinate value Q for the image coordinate system using Formulae (3) to (5). The image coordinate calculation unit 150 outputs the relation between the three-dimensional coordinate $P_R$ and the image coordinate value Q to the peripheral stereoscopic object point data generation unit 160. Note that the image coordinate calculation unit 150 repeatedly executes the above process every time the distance data of the distance data storage unit 130 are updated.

The peripheral stereoscopic object point data generation unit 160 is a process unit that generates the peripheral stereoscopic object point data 110b on the basis of the calculation results from the coordinate conversion unit 140 and the image coordinate calculation unit 150. For example, the peripheral stereoscopic object point data generation unit 160 compares the pair of the three-dimensional coordinate value $P_R$ in the actual space and the three-dimensional coordinate value $P_V$ in the virtual space, and the pair of the three-dimensional coordinate value $P_R$ in the actual space and the image coordinate value Q. Then, by associating the three-dimensional coordinate value $P_V$ in the virtual space and the image coordinate value Q using the three-dimensional coordinate value $P_R$ as a key, the peripheral stereoscopic object point data 110b are generated.

The frame buffer 170 is a memory device for storing the image data photographed by the cameras 10f, 10b, 10l, and 10r. For example, each camera 10 operates at a frame rate of 30 fps, and the image in the frame buffer 170 is replaced by a new image in 1/30 seconds.

The viewpoint decision unit 180 is a process unit that decides the virtual viewpoint position $V_P$. For example, the viewpoint decision unit 180 may designate the virtual viewpoint position $V_P$ in advance, or may decide the virtual viewpoint position $V_P$ dynamically based on the information of various kinds of sensors mounted on the vehicle 1. The viewpoint decision unit 180 outputs the information on the virtual viewpoint position $V_P$ to the coordinate conversion unit 140 and the drawing unit 190.

The drawing unit 190 is a process unit that draws a bird's-eye view and displays the bird's-eye view in the image display unit 200. For example, the drawing unit 190 draws a polygonal shape for the stereoscopic projection plane based on the virtual viewpoint position. Then, the drawing unit 190 acquires the image data of the frame buffer 170 as texture, and draws the camera image into the polygonal shape for the stereoscopic projection plane on the basis of the stereoscopic projection plane polygon data 110a. The drawing unit 190 draws the image data in the polygonal shape for the stereoscopic projection plane on the basis of the peripheral stereoscopic object point data 110b. Note that in the case where the coordinate of the stereoscopic projection plane polygon data 110a and the coordinate of the peripheral stereoscopic object point data 110b coincide with each other on the same coordinate on the polygonal shape for the stereoscopic projection plane, the drawing unit 190 draws the images in the overlapped state. For example, the drawing unit 190 executes repeatedly the drawing every 1/30 seconds.

The drawing unit 190 outputs the information of the drawing results to the image display unit 200 and displays the bird's-eye view therein. The drawing unit 190 can be mounted as hardware by a standard 3D graphics LSI, or alternatively mounted as software by, for example, OpenGL as a standard 3D graphics library.

Figure 9A:
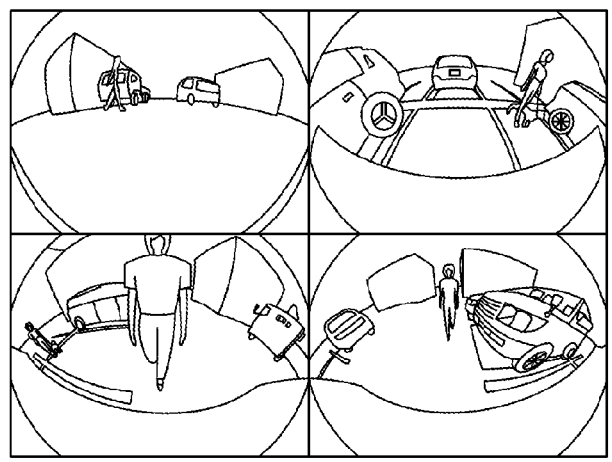
FIG. 9A depicts an example of an image photographed by each camera 10.
Figure 9B:
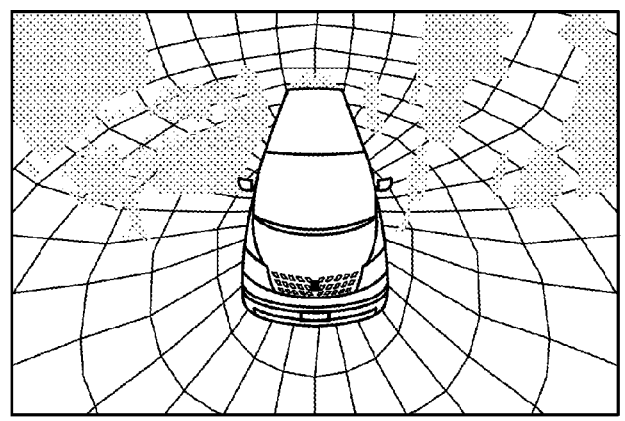
FIG. 9B depicts a plane identified by a stereoscopic plane, stereoscopic projection plane polygon data, and peripheral stereoscopic object point data.
Figure 9C:
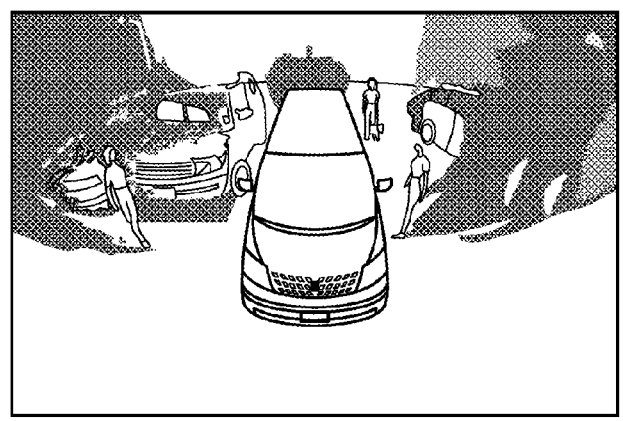
FIG. 9C depicts an example of a bird's-eye view.

FIG. 9A depicts an example of an image photographed by each camera 10. FIG. 9B depicts a plane identified by the stereoscopic object plane, the stereoscopic projection plane polygon data, and the peripheral stereoscopic object point data. FIG. 9C depicts an example of the bird's-eye view. The drawing unit 190 extracts the image data of FIG. 9A and pastes the image to the plane of FIG. 9B, thereby generating the bird's-eye view of FIG. 9C.

The image display unit 200 is a display device for acquiring the information on the drawing results and displaying the bird's-eye view.

Figure 10:
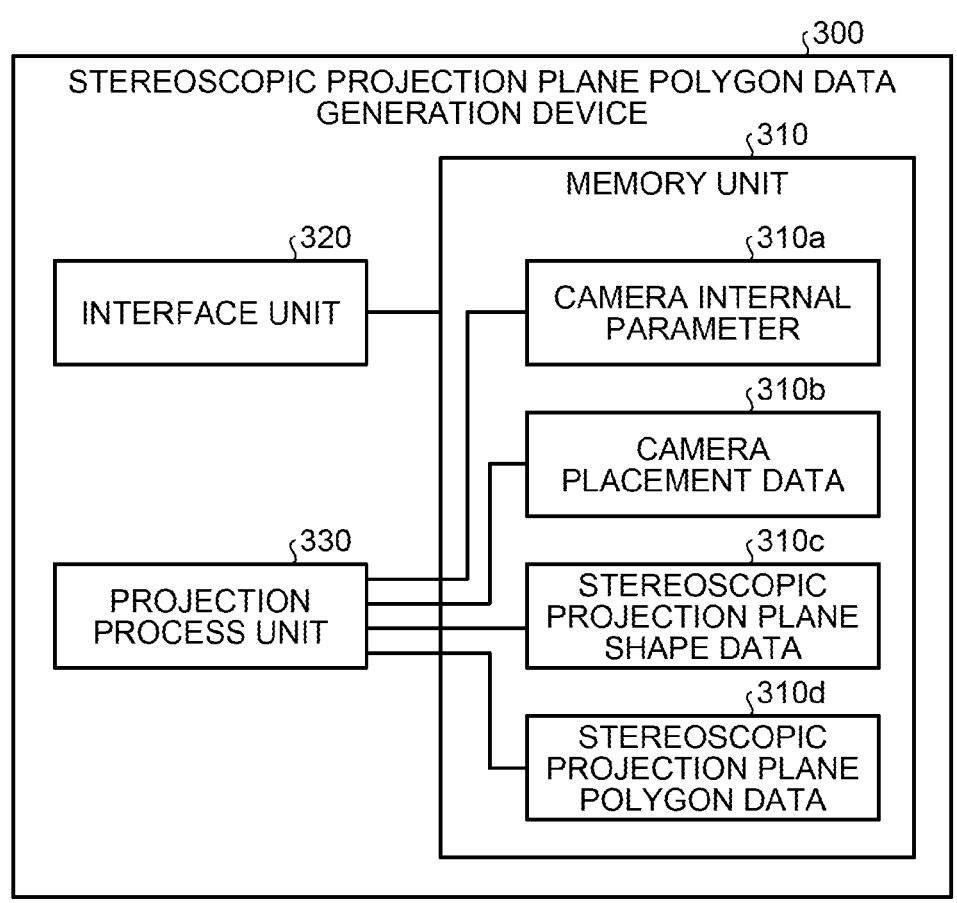
FIG. 10 depicts a structure of a stereoscopic projection plane polygon data generation device.

Next, a stereoscopic projection plane polygon data generation device for generating the stereoscopic projection plane polygon data 110a is described. FIG. 10 depicts a structure of the stereoscopic projection plane polygon data generation device. As depicted in FIG. 10, the stereoscopic projection plane polygon data generation device 300 includes a memory unit 310, an interface unit 320, and a projection process unit 330.

The memory unit 310 includes a camera internal parameter 310a, camera placement data 310b, stereoscopic projection plane shape data 310c, and stereoscopic projection plane polygon data 310d.

Among those, the camera internal parameter 310a includes the information of the lens distortion of the cameras 10f, 10b, 10l, and 10r. The camera placement data 310b includes the three-dimensional coordinate values where the cameras 10f, 10b, 10l, and 10r are placed. The camera placement data 310b includes the roll angle, the pitch angle, and the yaw angle of the cameras 10f, 10b, 10l, and 10r.

The stereoscopic projection plane shape data 310c are the data on the shape of the stereoscopic projection plane. For example, the stereoscopic projection plane shape data are similar to those of FIG. 5A and FIG. 5B.

The stereoscopic projection plane polygon data 310d are the data for associating the three-dimensional coordinate value on the stereoscopic projection plane formed of a polygon, and the image coordinate value. The data structure of the stereoscopic projection plane shape data 310c is similar to that of FIG. 3.

The interface unit 320 is a process unit that is connected to an external device for exchanging data with the external device. For example, the interface unit 320 outputs the stereoscopic projection plane polygon data 310d to the image processing apparatus 100. For example, the interface unit 320 corresponds to the input/output interface device.

The projection process unit 330 is a process unit that generates the stereoscopic projection plane polygon data 310d on the basis of the camera internal parameter 310a, the camera placement data 310b, and a stereoscopic projection plane shape data 320c.

Figure 11:
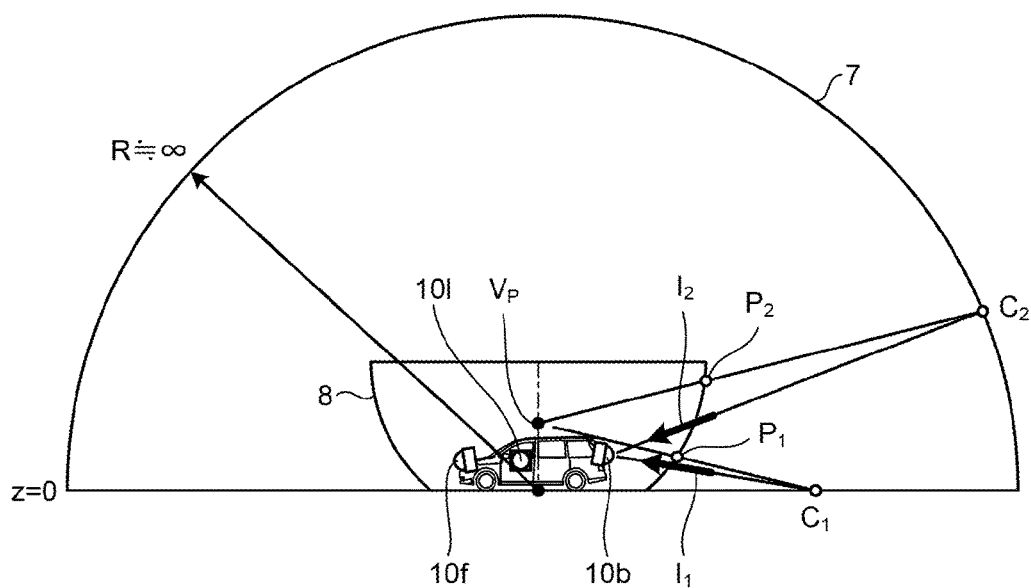
FIG. 11 is an explanatory view for a virtual viewpoint projection.

Here, the description is made of the virtual viewpoint projection. FIG. 11 is a diagram for describing the virtual viewpoint projection. In FIG. 11, a reference symbol 7 denotes the virtual viewpoint projection plane. The virtual viewpoint projection plane 7 has a shape obtained by combining the road plane and a semicircle having a sufficiently large radius R and a center at the origin of the vehicle coordinate system in the range where the Z-axis is 0 or more. The radius R may be a finite numeral as long as the distance between the cameras can be regarded as an error. For example, the radius R of the virtual viewpoint projection plane 7 is 10 km. In FIG. 11, a reference symbol 8 denotes the stereoscopic projection plane.

Figure 12:
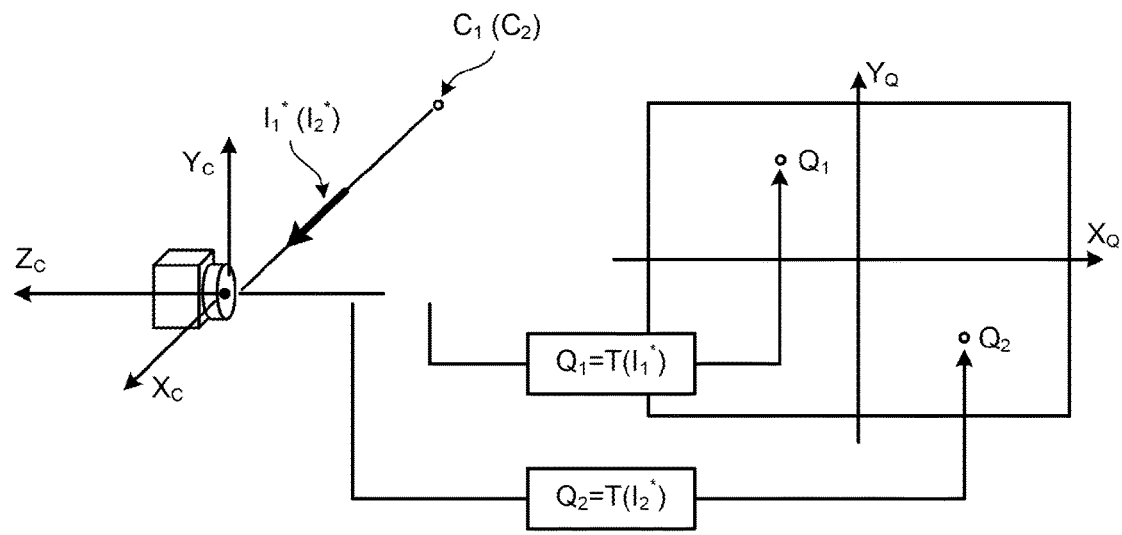
FIG. 12 is an explanatory view for a method of calculating the relation between the apex coordinate of the polygon and the image coordinate system.

FIG. 12 is a diagram for describing a method of calculating the relation between the apex coordinate of the polygon and the image coordinate system. In FIG. 12, the X-axis, Y-axis, and Z-axis of the camera coordinate system are denoted by $X_C$, $Y_C$, and $Z_C$, respectively. The X-axis and Y-axis of the image coordinate system are denoted by $X_Q$ and $Y_Q$, respectively.

The projection process unit 330 decides one virtual viewpoint position $V_P$ serving as the reference for forming the entire circumferential image around the vehicle 1 as depicted in FIG. 11. By extending a line connecting the virtual viewpoint position $V_P$ and the apex $P_1$ of the polygon on the stereoscopic projection plane 8, the projection process unit 330 obtains an intersection $C_1$ with the virtual viewpoint projection plane 7. The intersection $C_1$ is positioned on the road plane part of the virtual viewpoint projection plane.

Similarly, by extending a line connecting the virtual viewpoint position $V_P$ and the apex $P_2$ of the polygon on the stereoscopic projection plane 8, the projection process unit 330 obtains an intersection $C_2$ with the virtual viewpoint projection plane 7 as depicted in FIG. 11. The intersection $C_2$ is positioned on the hemispherical part of the virtual viewpoint projection plane 7.

The projection process unit 330 obtains an incident light vector $I_1$ of the vehicle coordinate system from the intersection $C_1$ to the camera 10b as depicted in FIG. 11. The projection process unit 330 obtains an incident light vector $I_2$ of the vehicle coordinate system from the intersection $C_2$ to the camera 10b.

The projection process unit 330 converts the incident light vectors $I_1$ and $I_2$ of the vehicle coordinate system into incident light vectors $I_1^*$ and $I_2^*$ of the camera coordinate system. A method of converting the incident light vectors from the vehicle coordinate system to the camera coordinate system is described below.

Figure 13:
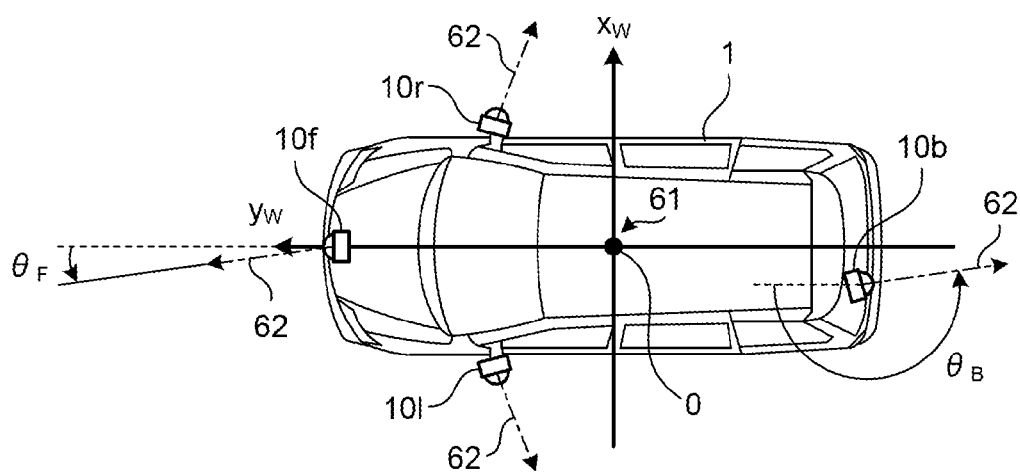
FIG. 13 is a diagram (1) of an example of a camera parameter.
Figure 14:
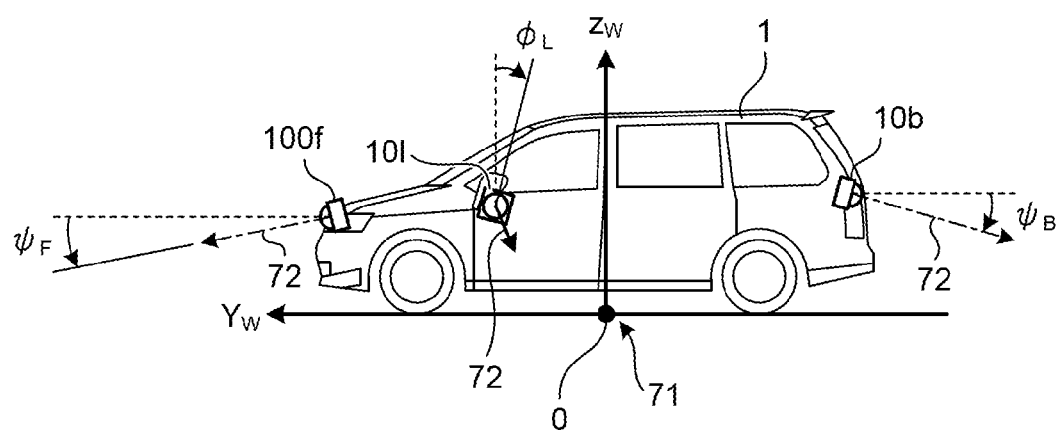
FIG. 14 is a diagram (2) of an example of a camera parameter.

FIG. 13 and FIG. 14 depict an example of the camera parameter. FIG. 13 depicts a state in which the vehicle 1 is viewed from above vertically. FIG. 14 depicts a state in which the vehicle 1 is viewed from the left side. The coordinate system in FIG. 13 and FIG. 14 are the vehicle coordinate system. The X-axis, Y-axis, and Z-axis of the vehicle coordinate system are denoted by $X_W$, $Y_W$, and $Z_W$, respectively. Moreover, $\theta_F$ and $\theta_B$ in FIG. 13 and $\phi_F$, $\phi_B$, and $\phi_L$ in FIG. 14 represent the angle parameters originated from the camera attachment angles in the vehicle coordinate system. Although FIG. 13 and FIG. 14 do not depict, the position parameter of the vehicle coordinate system originated from the camera attachment position is represented by, for example, the three-dimensional coordinates (X-coordinate: xw, Y-coordinate: yw, and Z-coordinate: zw). The camera placement parameter and the angle parameter correspond to the camera placement data 110e of FIG. 1 and the camera placement data 310b of FIG. 10.

The projection process unit 330 sets the coordinate of the intersection $C_1$ obtained in the vehicle coordinate system as "$C_1=(C_1x, C_1y, C_1z)$". Then, the projection process unit 330 obtains the coordinate "$C_1=(C_1^*x, C_1^*y, C_1^*z)$" of the position $C_1^*$ of the camera coordinate system corresponding to the coordinate "$C_1=(C_1x, C_1y, C_1z)$" of the intersection $C_1$ using Formulae (6) to (15) below.

In Formula (6), cp=cos θ, and sp=sin θ. Moreover, ct=cos ψ, st=sin ψ, cr=cos ϕ, and sr=sin ϕΦ. Note that $C_{CAM}$ corresponds to "C*x, C*y, C*z, 1" and $C_{CAR}$ corresponds to "Cx, Cy, Cz, 1".

$$C_{CAM} = \begin{pmatrix} cr \times cp - sr \times st \times sp & cr \times sp + sr \times st \times cp & sr \times ct & 0 \\ -sr \times cp - cr \times st \times sp & -sr \times sp + cr \times st \times cp & cr \times ct & 0 \\ ct \times sp & -ct \times cp & st & 0 \\ 0 & 0 & 0 & 1 \end{pmatrix} \quad (6)$$

$$= \begin{pmatrix} 1 & 0 & 0 & -xw \\ 0 & 1 & 0 & -yw \\ 0 & 0 & 1 & -zw \\ 0 & 0 & 0 & 1 \end{pmatrix} C_{CAR}$$

$$C_{CAM} = \begin{pmatrix} m_{11} & m_{21} & m_{13} & -m_{11}xw - m_{12}yw - m_{13}zw \\ m_{21} & m_{22} & m_{23} & m_{21}xw - m_{22}yw - m_{23}zw \\ m_{31} & m_{32} & m_{33} & m_{31}xw - m_{32}yw - m_{33}zw \\ 0 & 0 & 0 & 1 \end{pmatrix} C_{CAR} \quad (7)$$

$$m11 = \cos\phi \times \cos\theta - \sin\phi \times \sin\psi \times \sin\theta \quad (8)$$

$$m12 = \cos\phi \times \sin\theta + \sin\phi \times \sin\psi \times \cos\theta \quad (9)$$

$$m13 = \sin\phi \times \cos\psi \quad (10)$$

$$m21 = -\sin\phi \times \cos\theta - \cos\theta - \cos\phi \times \sin\psi \times \sin\theta \quad (11)$$

$$m22 = -\sin\phi \times \sin\theta + \cos\phi \times \sin\psi \times \cos\theta \quad (12)$$

$$m23 = \cos\phi \times \cos\psi \quad (13)$$

$$m31 = \cos\psi \times \sin\theta \quad (14)$$

$$m32 = -\cos\psi \times \cos\theta \quad (15)$$

Similarly, the projection process unit 330 sets the coordinate of the intersection $C_2$ obtained in the vehicle coordinate system as "$C_2=(C_2x, C_2y, C_2z)$". Then, the projection process unit 330 obtains the coordinate "$C_2*=(C_2*x, C_2*y, C_2*z)$" of the position $C_2*$ of the camera coordinate system corresponding to the intersection $C_2$.

Using the position $C_1*$ of the camera coordinate system, the projection process unit 330 converts the incident light vector $I_1$ toward the camera 10b, which is obtained in the vehicle coordinate system, into the incident light vector $I_1*$ for the camera coordinate system. Using the position $C_2*$ of the camera coordinate system, the projection process unit 330 converts the incident light vector $I_2$ toward the camera 10b, which is obtained in the vehicle coordinate system, into the incident light vector $I_2*$ for the camera coordinate system.

Further, the projection process unit 330 obtains the image coordinate $Q_1$ for the image coordinate system from the incident light vector $I_1*$ for the camera coordinate system using Formula (16). Moreover, the projection process unit 330 obtains the image coordinate $Q_2$ for the image coordinate system from the incident light vector $I_2*$ for the camera coordinate system using Formula (17). In Formulae (16) and (17), T represents the function or table representing the relation between the photographing position and the incident light vector defined for each camera, which is uniquely determined by the camera internal parameter 310a.

$$Q_1* = T(1_1*) \quad (16)$$

$$Q_2* = T(1_2*) \quad (17)$$

The projection process unit 330 generates the stereoscopic projection plane polygon data 310d by associating the coordinate value of each camera image in the image coordinate system and the coordinate value of the apex of each polygon on the stereoscopic projection plane in the vehicle coordinate system. The stereoscopic projection plane polygon data 310d are used in the image processing apparatus 100 of FIG. 1. The stereoscopic projection plane polygon data 310d in FIG. 10 correspond to the stereoscopic projection plane polygon data 110a in FIG. 1.

Figure 15:
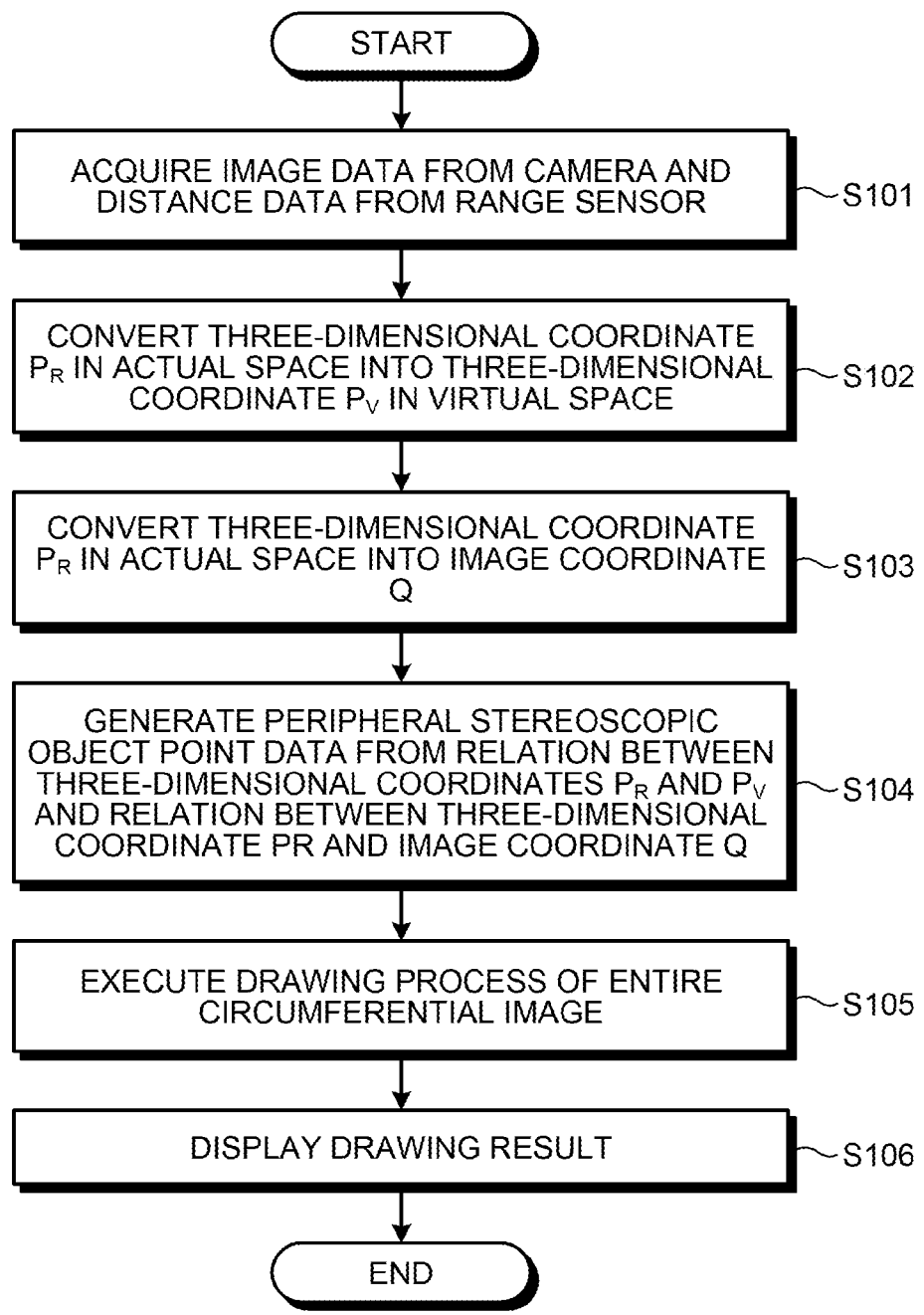
FIG. 15 is a flowchart of the procedure of the process of an image processing apparatus according to this embodiment.

Next, the procedure of the process of the image processing apparatus 100 according to this embodiment is described. FIG. 15 is a flowchart depicting the procedure of the process of the image processing apparatus according to this embodiment. For example, the process depicted in FIG. 15 is triggered by the acquisition of the image data from the cameras 10f to 10r and the acquisition of the distance data from the range sensors 20f to 20r.

As depicted in FIG. 15, the image processing apparatus 100 acquires the image data from the cameras 10f to 10r, and acquires the distance data from the range sensors 20f to 20r (Step S101). The image processing apparatus 100 converts the three-dimensional coordinate $P_R$ in the actual space into the three-dimensional coordinate $P_V$ in the virtual space (Step S102).

The image processing apparatus 100 converts the three-dimensional coordinate $P_R$ in the actual space into the image coordinate Q (Step S103). The image processing apparatus 100 generates the peripheral stereoscopic object point data on the basis of the relation between the three-dimensional coordinates $P_R$ and $P_V$ and the relation between the three-dimensional coordinate $P_R$ and the image coordinate Q (Step S104).

The image processing apparatus 100 executes the drawing process for the entire circumferential image by pasting the image data to the polygon data on the basis of the stereoscopic projection plane polygon data 110a and the peripheral stereoscopic object point data 110b (Step S105). The image processing apparatus 100 displays the drawing results (Step S106).

Next, an effect of the image processing apparatus 100 according to this embodiment is described. The image processing apparatus 100 according to this embodiment obtains the coordinate of the intersection $P_{VG}$ between the stereoscopic projection plane and the line connecting the ground point $P_{RG}$ of the stereoscopic object and the virtual viewpoint position $V_P$, and obtains the coordinate of the intersection $P_V$ between the line extending upward from the intersection $P_{VG}$ and the line connecting the point $P_R$ of the stereoscopic object and the virtual viewpoint position $V_P$. Then, the image processing apparatus 100 projects the image of $P_R$ of the stereoscopic object to the position at the coordinate of the $P_V$. Through the execution of the process as above by the image processing apparatus 100, the stereoscopic object with a height component can be projected to the inside of the stereoscopic projection plane 5, and the stereoscopic object can be displayed as appropriate in the bird's-eye view.

Further, the image processing apparatus 100 can draw the image data of each frame in the stereoscopic projection plane as appropriate because the camera images are drawn on the stereoscopic projection plane based on the peripheral stereoscopic object point data 110b including the correlation between the coordinate value of the image coordinate system and the coordinate value on the stereoscopic projection plane.

The image processing apparatus 100 sets the intersection between the ground plane and the line extending downward from the point $P_R$ on the stereoscopic object at an angle in a predetermined range as the ground point $P_{RG}$, and calculates the coordinates of the intersection $P_V$ between the line extending upward from the intersection $P_{VG}$ and the line connecting the intersection $P_R$ of the stereoscopic object and the virtual viewpoint at an angle in a predetermined range. Through the execution of the process as above by the image processing apparatus 100, the angle of the stereoscopic object in the virtual space can be adjusted.

Incidentally, the structure of the image processing apparatus 100 depicted in FIG. 1 is just an example, and may include another process unit additionally. For example, the image processing apparatus 100 may have a stereoscopic model generation unit.

The stereoscopic model generation unit generates, for example, a virtual stereoscopic model. The virtual stereoscopic model corresponds to, for example, a stereoscopic object such as a pole, a pylon, or a guide line, and the virtual stereoscopic model has a coordinate at a position away from the vehicle 1 by a predetermined distance. The stereoscopic model generation unit outputs the coordinate information on the virtual stereoscopic model to the coordinate conversion unit 140. The virtual stereoscopic model is converted into the coordinate in the virtual space, and displayed on the bird's-eye view by the drawing unit 190. Note that since the virtual stereoscopic model does not contain the pixels corresponding to the camera image, the virtual stereoscopic model can be overlapped and displayed in the bird's-eye view by assigning predetermined color attributes. By displaying such a virtual stereoscopic model in the bird's-eye view, for example, the driving of a driver can be assisted.

The process of the coordinate conversion unit 140 is not limited to the above. Here, another process of the coordinate conversion unit 140 is described. The coordinate conversion unit 140 may change the value of θ depicted in FIG. 6 in accordance with the distance from the stereoscopic object, and convert the three-dimensional coordinate value $P_R$ of the actual space into the three-dimensional coordinate value $P_V$ of the virtual space. For example, as the stereoscopic object and the vehicle are separated far from each other, the coordinate conversion unit 140 may increase the θ between the lines 5a and 5c from the three-dimensional coordinate $P_R$ of the stereoscopic object to obtain the three-dimensional coordinate $P_V$. By adjusting the value of θ in this manner, the distortion of the stereoscopic object drawn on the stereoscopic projection plane can be reduced.

Figure 16:
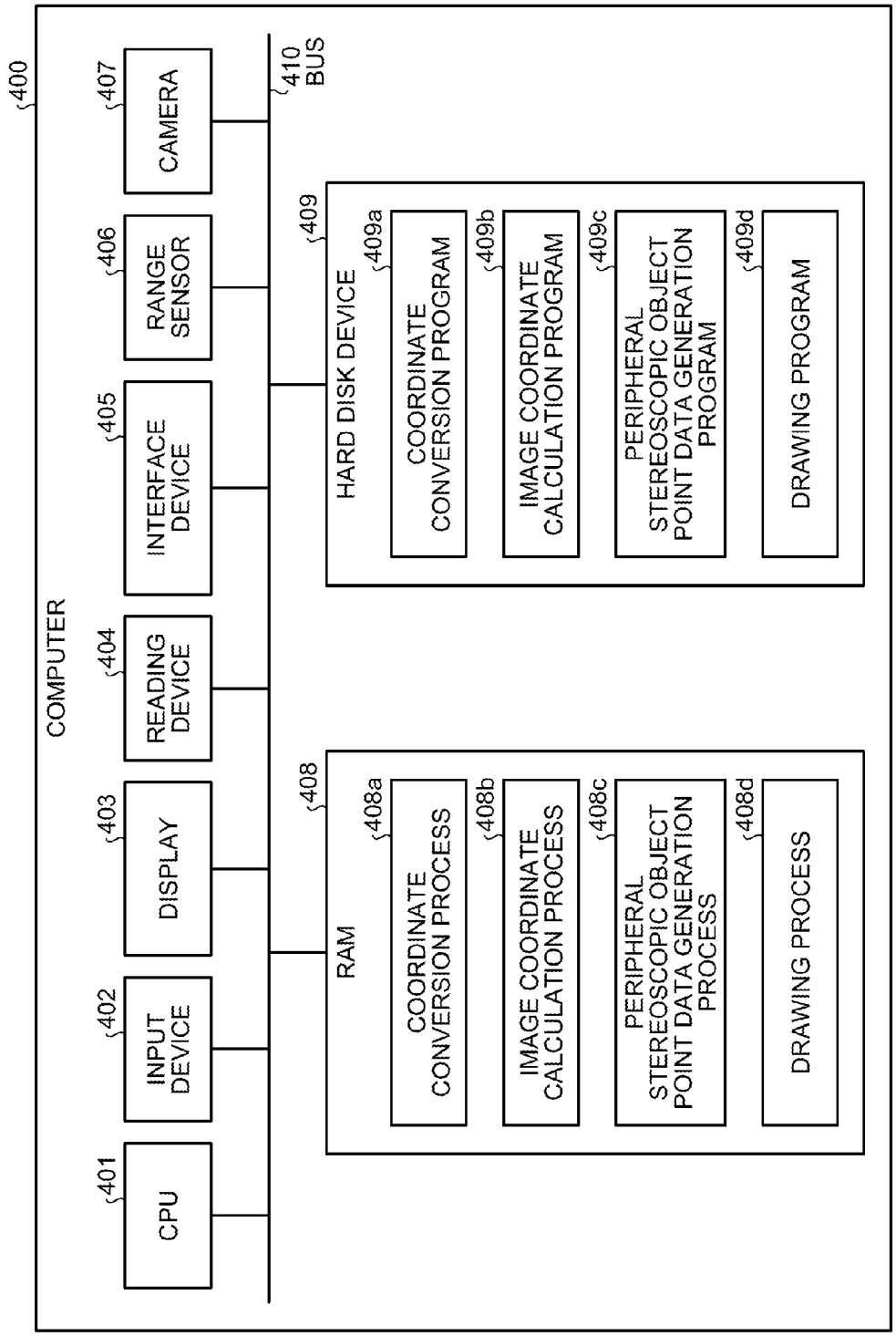
FIG. 16 depicts an example of a computer configured to execute an image processing program.
Figure 17:
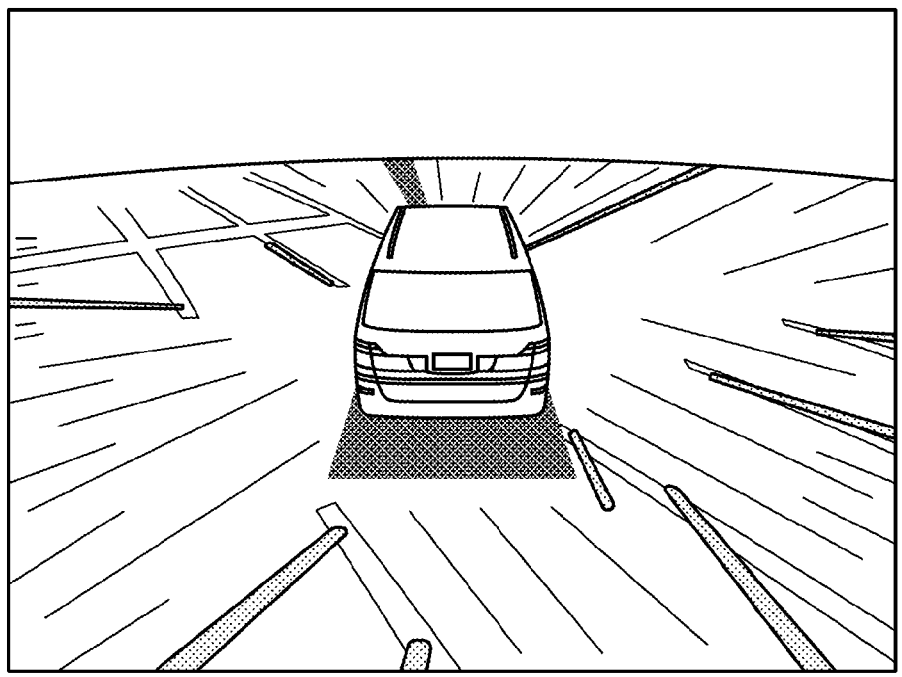
FIG. 17 depicts an example of a bird's-eye view formed based on Japanese Patent No. 3286306.
Figure 18:
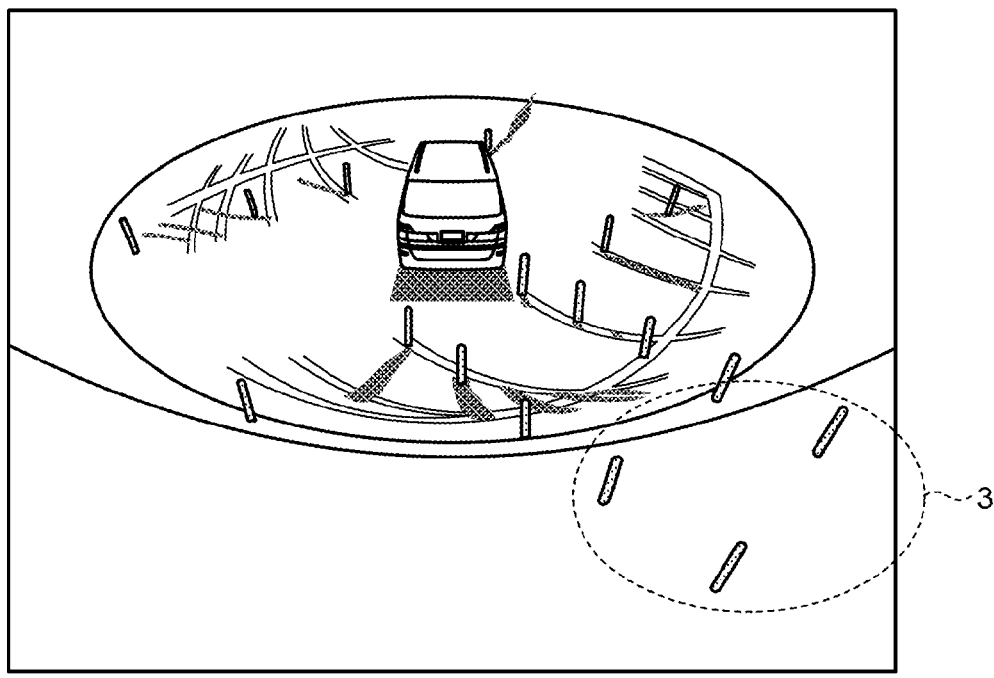
FIG. 18 depicts an example of a bird's-eye view formed based on Japanese Laid-open Patent Publication No. 2003-132349.
Figure 19:
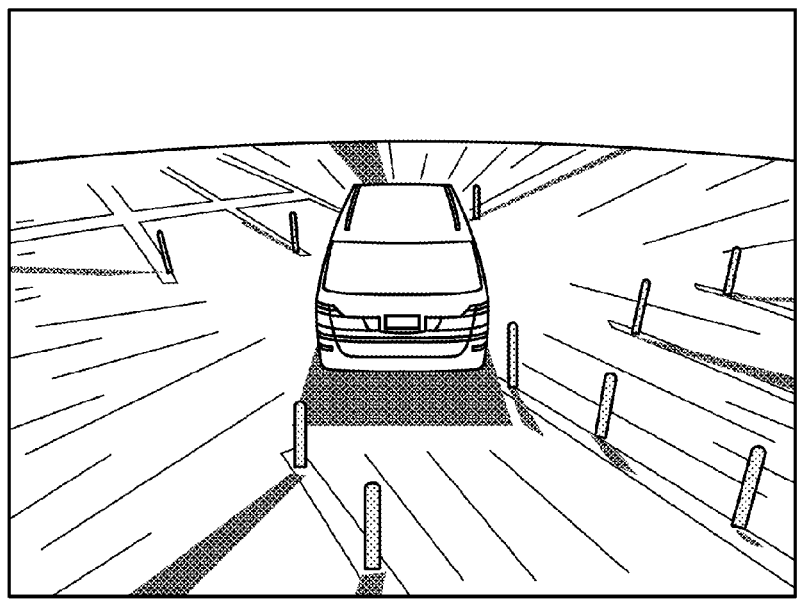
FIG. 19 depicts an example of a bird's-eye view formed based on Japanese Laid-open Patent Publication No. 07-17328.
Figure 20:
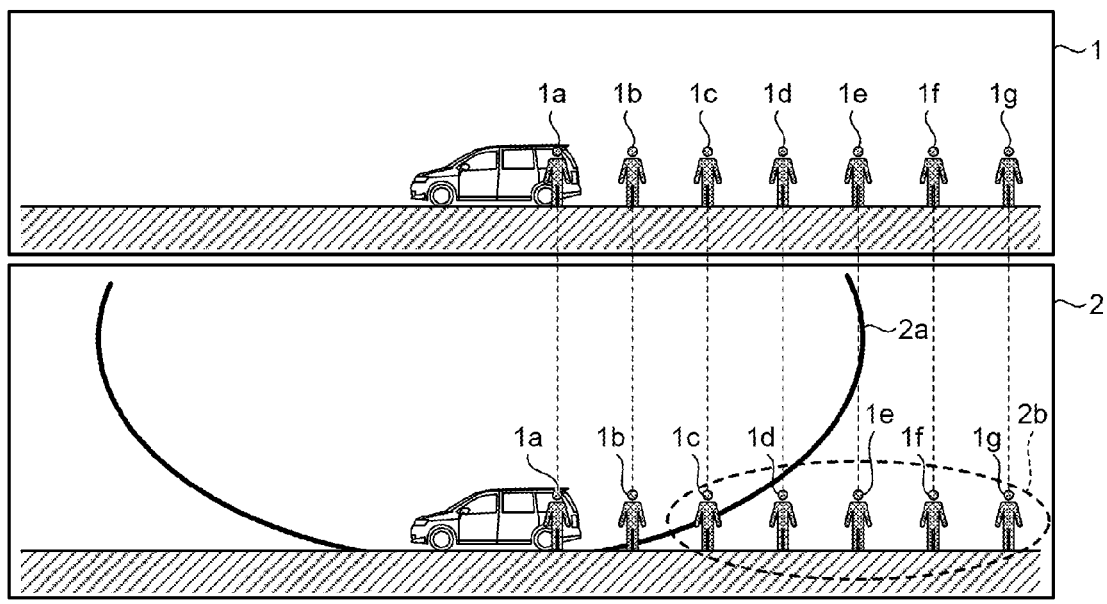
FIG. 20 is an explanatory view for the problem in the conventional technique.

Next, an example of a computer for executing an image processing program for achieving the similar function to the image processing apparatus 100 depicted in FIG. 1 is described. FIG. 16 depicts an example of the computer executing the image processing program.

As depicted in FIG. 16, a computer 400 includes a CPU 401 for executing various calculation processes, an input device 402 accepting the input of data from a user, and a display 403. The computer 400 additionally includes a reading device 404 for reading a program, etc. from a storage medium, and an interface device 405 for exchanging data with another computer via a network. The computer 400 further has a plurality of range sensors 406 and a plurality of cameras 407. Moreover, the computer 400 has a RAM 408 for temporarily storing various information and a hard disk device 409. The devices 401 to 409 are connected to a bus 410

The hard disk device 409 stores, for example, a coordinate conversion program 409a, an image coordinate calculation program 409b, a peripheral stereoscopic object point data generation program 409c, and a drawing program 409d. The CPU 401 reads out the programs 409a to 409d and develops the programs in the RAM 408. The coordinate conversion program 409a functions as a coordinate conversion process 408a. The image coordinate calculation program 409b functions as an image coordinate calculation process 408b. The peripheral stereoscopic object point data generation program 409c functions as a peripheral stereoscopic object point data generation process 408c. The drawing program 409d functions as a drawing process 408d.

For example, the coordinate conversion process 408a corresponds to the coordinate conversion unit 140. The image coordinate calculation process 408b corresponds to the image coordinate calculation unit 150. The peripheral stereoscopic object point data generation process 408c corresponds to the peripheral stereoscopic object point data generation unit 160. The drawing process 408d corresponds to the drawing unit 190.

For example, the programs 409a to 409d are stored in a "portable physical medium", such as a flexible disk (FD), a CD-ROM, a DVD disk, an optomagnetic disk, or an IC card, which is inserted into the computer 400. Then, the computer 400 may read out the programs 409a to 409d from these and may execute the programs.

The process units 140 to 160, 180, 190, 320, and 330 depicted in FIG. 1 and FIG. 10 correspond to, for example, an integrated device such as an ASIC (Application Specific Integrated Circuit) or an FPGA (Field Programmable Gate Array). Each process unit corresponds to, for example, an electronic circuit such as a CPU or an MPU (Micro Processing Unit).

The storage units 110 and 310 depicted in FIG. 1 and FIG. 10 correspond to, for example, a semiconductor memory element such as a RAM (Random Access Memory), a ROM (Read Only Memory), or a flash memory (Flash Memory), or a storage device such as a hard disk or an optical disk.

An image processing apparatus to be disclosed herein can provide an effect that the stereoscopic object can be displayed in a bird's-eye view as appropriate.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:
1. An image processing apparatus comprising:
a memory; and
a processor coupled to the memory, wherein the processor executes a process comprising:
measuring a top position of an object using a range sensor, the object located outside of a stereoscopic projection plane;
calculating a coordinate of a first intersection ($P_{VG}$) representing an intersection between the stereoscopic projection plane and a first line connecting a virtual viewpoint and an intersection ($P_{RG}$) between a plane and a line extending downward from the top position of the object, and a coordinate of a second intersection ($P_V$) representing an intersection between a line extending upward from the first intersection ($P_{VG}$) and a line connecting the top position of the object and the virtual viewpoint, an angle between the first line and a second line is a predetermined angle, the second line being a line that extends vertically downward from the top position of the object; and projecting an image of the object to the coordinate of the second intersection ($P_V$).

2. The image processing apparatus according to claim 1, wherein the process further comprises drawing a camera image for the stereoscopic projection plane based on information including a correlation between a coordinate on the camera image and a coordinate on the stereoscopic projection plane.

3. The image processing apparatus according to claim 2, wherein the calculating calculates a ground point which is an intersection between a ground plane and a line extending downward from a point on the object at an angle in a predetermined range, and the coordinate of the second intersection representing an intersection between a line connecting the virtual viewpoint and a point on an opposite side of the ground point of the object and a line extending upward from the first intersection at an angle in a predetermined range.

4. The image processing apparatus according to claim 1, wherein the process further comprises generating a virtual stereoscopic model, and the calculating calculates the first intersection and the second intersection relative to the stereoscopic model, and the projecting projects the stereoscopic model to the stereoscopic projection plane based on the first intersection and the second intersection relative to the stereoscopic model.

5. An image processing method executed by a computer, the method comprising:
measuring a top position of an object using a range sensor, the object located outside of a stereoscopic projection plane;
calculating a coordinate of a first intersection ($P_{VG}$) representing an intersection between the stereoscopic projection plane and a first line connecting a virtual viewpoint and an intersection ($P_{RG}$) between a plane and a line extending downward from the top position of the object, and a coordinate of a second intersection ($P_V$) representing an intersection between a line extending upward from the first intersection ($P_{VG}$) and a line connecting the top position of the object and the virtual viewpoint, an angle between the first line and a second line is a predetermined angle, the second line being a line that extends vertically downward from the top position of the object; and
projecting an image of the object to the calculated second intersection ($P_V$).

6. A non-transitory computer-readable recording medium having stored therein a program for causing a computer to execute an image process comprising:
measuring a top position of an object using a range sensor, the object located outside of a stereoscopic projection plane;
calculating a coordinate of a first intersection ($P_{VG}$) representing an intersection between the stereoscopic projection plane and a first line connecting a virtual viewpoint and an intersection ($P_{RG}$) between a plane and a line extending downward from the top position of the object, and a coordinate of a second intersection ($P_V$) representing an intersection between a line extending upward from the first intersection ($P_{VG}$) and a line connecting the top position of the object and the virtual viewpoint, an angle between the first line and a second line is a predetermined angle, the second line being a line that extends vertically downward from the top position of the object; and
projecting an image of the object to the calculated second intersection ($P_V$).

* * * * *